United States Patent Office 2,947,601
Patented Aug. 2, 1960

2,947,601

COMPLEX FLUORIDES OF PLUTONIUM AND AN ALKALI METAL

Glenn T. Seaborg, Albany, Calif., assignor to the United States of America as represented by the United States Atomic Energy Commission No Drawing. Filed May 23, 1947, Ser. No. 750,175

7 Claims. (Cl. 23—14.5)

My invention relates to the processing of plutonium and includes among its objects and advantages the production of new compounds of plutonium particularly useful as intermediate forms in the concentration or purification of plutonium. The compounds are double fluorides which have the advantage that they are readily formed in and precipitated from aqueous solution and that they are very insoluble.

As outlined in my co-pending application, Serial No. 637,485, filed December 27, 1945, of which this application is a continuation in part, the common source of plutonium is neutron-irradiated uranium. The irradiation necessary to produce the plutonium is accompanied by the formation of substantial quantities of objectionably radioactive fission products, and separation of the desired plutonium from these products and from the parent substance is a difficult matter. The over-all process for such separation involves precipitation of the plutonium, in the first instance from solutions in which the plutonium itself is present in extremely minute concentrations. Under such circumstances variations in the insolubility of highly insoluble compounds become significant.

The compounds of this invention are not the most insoluble plutonium compounds known. For instance, with tetravalent plutonium greater insolubility can be obtained with ortho-phosphates and hydroxides in properly conditioned solutions. But the double fluorides precipitate readily and reliably under suitable conditions and are sufficiently insoluble to be employed with high percentage yields in many of the successive steps of the concentration process. For instance, the potassium double flouride, $KPuF_5$, in solutions containing conveniently available concentrations of HF and $HNO_3$, may have a solubility as low as 10 mg. of plutonium per liter, or 0.001%. Therefore, while a first precipitation with a more insoluble compound is usually to be preferred, as soon as a concentration even up to 0.1% of plutonium has been achieved, it becomes possible to precipitate the double fluoride with a yield of 99.9%, so far as the loss by solubility is concerned. Under such circumstances considerations other than loss by solubility become more significant than the solubility itself.

Another advantage is that the different double fluorides crystallize in different crystal forms, so that, by selecting appropriate forms isomorphic with other compounds desired as co-precipitates, or non-isomorphic with compounds not desired, selective action can be secured in performing each precipitation, and such selectivity may be increased many times by a series of precipitations under different conditions.

Further objects and advantages will become apparent as the disclosure proceeds.

*Example I*

$KPuF_5$

Quadrivalent plutonium in dilute solution, prepared by dissolving plutonous peroxide in nitric acid, was added gradually to a solution of potassium fluoride in HF with stirring. Good working concentrations are 0.5 M for potassium and 3.5 M for HF, and plutonium at 0.5 gm. per liter. With a substantial excess of the alkali fluoride a substantially quantitative precipitation results. The precipitate may be centrifuged and washed twice with 0.3 N nitric acid and then twice with 50% ethanol (0.3 N in nitric acid to avoid hydrolysis). It is then washed with absolute methanol and dried, first in a suction air stream and then in an oven at 80° C.

*Example II*

$KPuF_5$

A solution containing $Pu^{+4}$ ion at about 2 gm. per l., and $K^+$ ion 10 gm. per l., and being 2.0 molar with respect to nitric acid, readily forms a precipitate when made 2.0 molar with respect to HF. This precipitate appears to be identical with that of Example 1.

*Example III*

$KPuF_5$

A solution may be made up containing 2 gm. per l. of $Pu^{+4}$, 1 M nitric acid and 2 M with HF. Upon the addition of potassium ion in the form of either potassium fluoride or potassium chloride up to 10 gm. per liter a precipitate forms readily. The precipitates of Examples 1, 2, and 3 all appear to be identical. The material consists of pale green, rhombohedral crystals having six molecules per unit cell. Measurement of the crystal constants indicates that they are:

$$a=9.27\pm0.03$$
$$\alpha=107°\ 2'\pm10'$$

*Example IV*

$NaPuF_5$

The substitution of sodium for potassium in any one of Examples 1, 2, and 3 will give a similar precipitate of the double sodium salt in the form of pale gray-green rhombohedral crystals having 6 molecules per unit cell. The crystal constants are:

$$a=8.93\pm0.03$$
$$\alpha=107°\ 28'\pm10'$$

*Example V*

$RbPuF_5$

The substitution of rubidium for potassium in any of Examples 1, 2, and 3 will give the corresponding rubidium double salt in the form of pale green rhombohedral crystals having 6 molecules per unit cell. The crystal constants are:

$$a=9.47\pm0.03$$
$$\alpha=106°\ 56'\pm10'$$

*Example VI*

$KPu_2F_9$

With $Pu^{+4}$ ion in concentration of 2 gm. per l. and $K^+$ ion present only up to a chemical trace, it has been possible to secure a crystalline precipitate having the formula given above. The crystals are orthorhombic with 4 molecules per unit cell and have the constants: $a_1=8.56\pm.04$, $a_2=6.95\pm0.04$, $a_3=11.33\pm0.60$.

*Example VII*

The double salt with lithium has been prepared and has a gray-green color and the double salt with caesium has been prepared and has a pale brown color. They precipitate readily according to any of Examples 1, 2, and 3. The precise crystal constants are not as yet available.

Others may readily adapt the invention for use under various conditions of service by employing one or more of the novel features herein disclosed or equivalents thereof. As at present advised with respect to the apparent scope of the present invention, I desire to claim the following subject matter:

1. A composition of matter consisting of a complex fluoride of plutonium and at least one alkali metal and being selected from the group consisting of a compound of the formula $MPuF_5$ wherein M designates an alkali metal and $KPu_2F_9$.

2. A composition of matter consisting of a double fluoride of plutonium and potassium having the empirical formula $KPuF_5$.

3. A composition of matter consisting of a double fluoride of plutonium and potassium having the empirical formula $KPu_2F_9$.

4. A composition of matter consisting of a double fluoride of plutonium and sodium of the formula $NaPuF_5$.

5. A composition of matter consisting of a double fluoride of plutonium and rubidium of the formula $RbPuF_5$.

6. In the purification or concentration of plutonium contained in an aqueous solution in the tetravalent state, the step of adding to said solution hydrogen fluoride and an alkali metal fluoride whereby a double fluoride salt containing plutonium and an alkali metal precipitates, and separating said precipitated double fluoride from said solution.

7. The process of isolating plutonium which comprises forming an aqueous solution containing quadrivalent plutonous ion adding potassium fluoride and hydrofluoric acid to said solution whereby an insoluble double fluoride of plutonium precipitates, and separating the double flouride from the solution.

References Cited in the file of this patent

Mellor: "Inorganic and Theoretical Chemistry," vol. 12, page 74 (1932), published by Longmans, Green & Co., London.

Villar "Journal of Chemical Education," vol. 19, pages 329, 330 (1942).

Seaborg et al.: Transuranium Elements," part I, pages 775–778, 822–824 (1949); and part II, pages 1462–1472 (1949) which reports the following AEC Documents: Cunningham et al., CN–556, page 2, Mar. 31, 1943; Anderson, CN–2767, page 39, March 1945.

Seaborg: "Chemical and Engineering News," vol. 23, No. 23, pages 2190–2193 (1945).